United States Patent
Moesli et al.

(10) Patent No.: US 9,085,423 B2
(45) Date of Patent: Jul. 21, 2015

(54) METHOD AND DEVICE FOR FEEDING LOOSE STACKS OF SHEETS INTO A TRANSPORT DUCT

(71) Applicant: Mueller Martini Holding AG, Hergiswil (CH)

(72) Inventors: Urs Moesli, Winterthur (CH); Beat Hoerler, Baenk-Daegerlen (CH)

(73) Assignee: MUELLER MARTINI HOLDING AG, Hergiswil (CH)

( * ) Notice: Subject to any disclaimer, the term of this patent is extended or adjusted under 35 U.S.C. 154(b) by 0 days.

(21) Appl. No.: 14/295,390

(22) Filed: Jun. 4, 2014

(65) Prior Publication Data

US 2014/0360839 A1    Dec. 11, 2014

(30) Foreign Application Priority Data

Jun. 5, 2013   (CH) ........................................ 1075/13

(51) Int. Cl.
| | |
|---|---|
| *B65G 47/34* | (2006.01) |
| *B65G 47/38* | (2006.01) |
| *B42C 19/08* | (2006.01) |
| *B65H 29/16* | (2006.01) |
| *B65H 29/38* | (2006.01) |

(52) U.S. Cl.
CPC ................ *B65G 47/38* (2013.01); *B42C 19/08* (2013.01); *B65H 29/16* (2013.01); *B65H 29/38* (2013.01); *B65H 2220/02* (2013.01); *B65H 2301/34112* (2013.01); *B65H 2301/4473* (2013.01)

(58) Field of Classification Search
CPC ........... B65H 2301/4473; B65G 47/82; B65G 47/71; B65G 13/10; B65G 47/52; B65G 47/53; B65G 47/57; B65G 47/646; B65G 47/647

USPC ......... 198/457.03, 457.07, 598, 369.2, 369.3, 198/370.04, 370.06
See application file for complete search history.

(56) References Cited

U.S. PATENT DOCUMENTS

| | | | | |
|---|---|---|---|---|
| 2,949,999 | A | * | 8/1960 | Sundin ........................ 198/369.2 |
| 3,550,740 | A | * | 12/1970 | Main et al. ................. 192/107 R |
| 3,670,869 | A | * | 6/1972 | Dimmock ..................... 198/598 |
| 4,598,815 | A | * | 7/1986 | Adama ..................... 198/370.09 |
| 5,362,040 | A | * | 11/1994 | Midavaine et al. ...... 198/457.03 |

(Continued)

FOREIGN PATENT DOCUMENTS

| | | |
|---|---|---|
| DE | 2231225 A1 | 1/1974 |
| DE | 3621601 A1 | 4/1987 |
| EP | 2292444 A2 | 3/2011 |

*Primary Examiner* — James R Bidwell
(74) *Attorney, Agent, or Firm* — Leydig, Voit & Mayer, Ltd.

(57) ABSTRACT

A device for feeding a book block, which is formed of at least one printed sheet and transported flat, to a processing station in a clocked manner includes a first and a second transport device. The first transport device has a comb-shaped introduction flap and transport units. The introduction flap includes teeth disposed on a base part and recesses formed between the teeth. The second transport device has a transport duct and a transport finger. The transport duct has a contact surface, a clearance and a gap. The first transport device engages, by the introduction flap, in the clearance. The recesses are open in a direction facing away from the transport duct. The transport units are disposed on a first side of the introduction flap. The introduction flap is connected to a controllable drive and has a pivot axis disposed on a second side of the introduction flap.

14 Claims, 3 Drawing Sheets

(56) References Cited

U.S. PATENT DOCUMENTS 6,015,039 A * 1/2000 Bonnet ......................... 198/368
7,614,491 B2 * 11/2009 Alesi et al. ................. 198/418.6
2003/0021668 A1 1/2003 Michler et al.

* cited by examiner

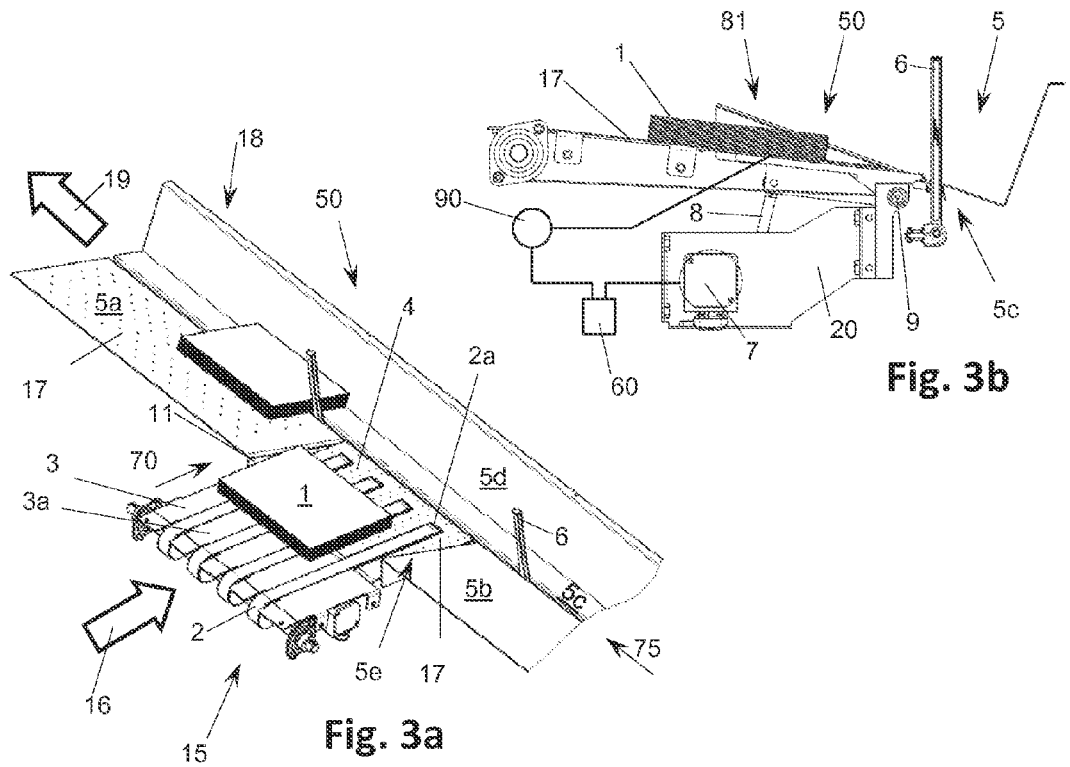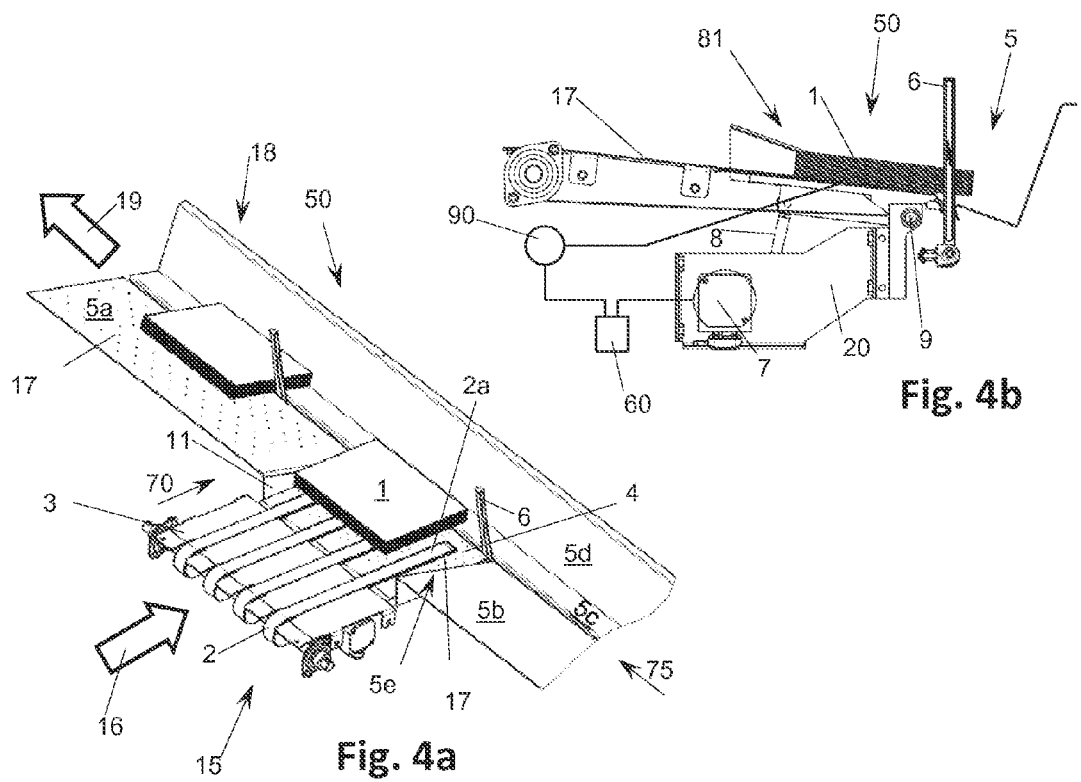

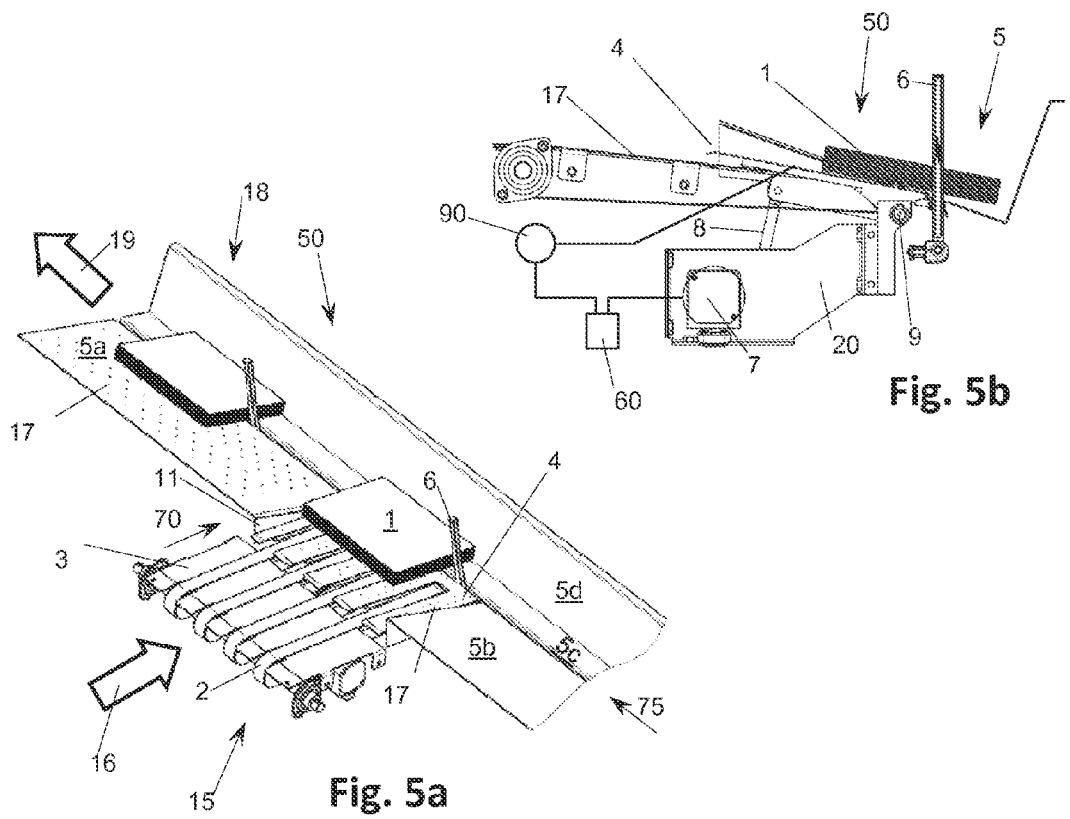
Fig. 5a
Fig. 5b
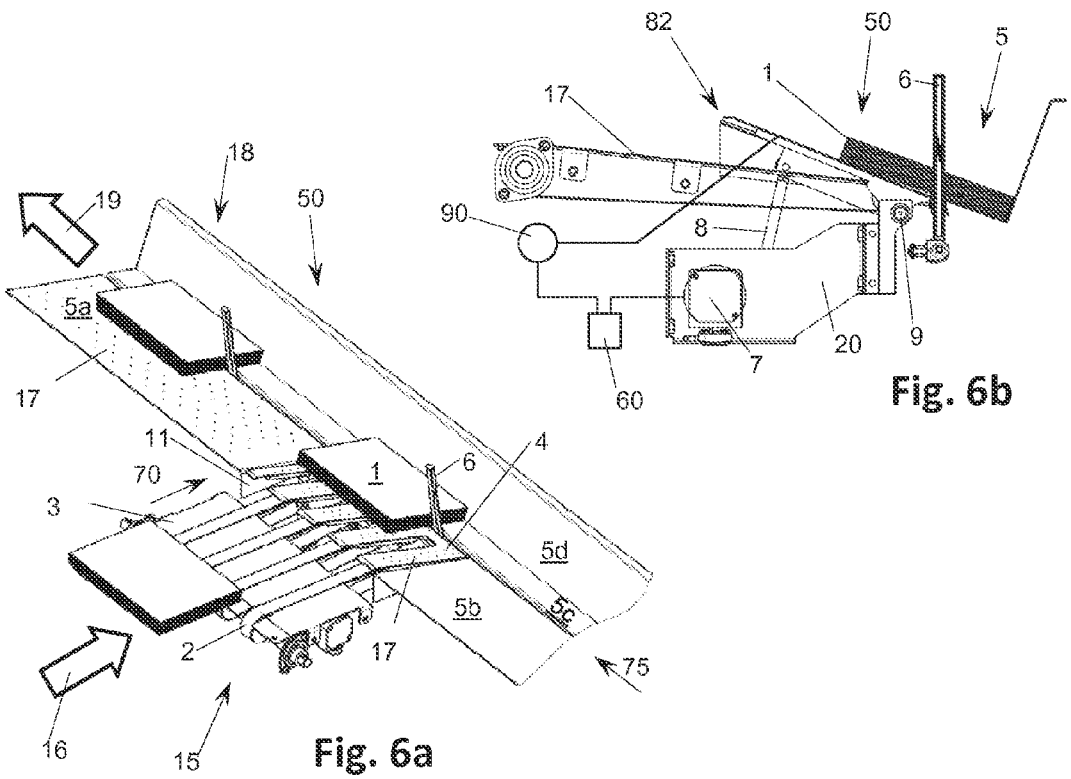
Fig. 6a
Fig. 6b

METHOD AND DEVICE FOR FEEDING LOOSE STACKS OF SHEETS INTO A TRANSPORT DUCT

CROSS-REFERENCE TO PRIOR APPLICATION

Priority is claimed to Swiss Patent Application No. CH 01075/13, filed on Jun. 5, 2013, the entire disclosure of which is hereby incorporated by reference herein.

FIELD

The present invention relates to a device and a method for feeding a book block, formed of at least one printed sheet and transported flat, to a processing station in a clocked manner, the device comprising a first and a second transport device, the second transport device having a transport duct comprising a contact surface, a clearance and a transport finger arranged in a gap in the transport duct, and the first transport device engaging in the clearance of the transport duct.

BACKGROUND

FIG. 9 of EP2292444 A2 discloses a transport device comprising a transport duct, by means of which book blocks are conveyed to a finishing station. A feed element in the form of a paddle wheel receives the fed book blocks individually in intermediate spaces between racks arranged on a disc, and initially conveys them onwards in the same rotational plane through rotation of the paddle wheel. After a predetermined angle of rotation, the book block is ejected from the feed element in a recess of the transport duct into said duct, transferred and passed on. The aforementioned construction of the feed element is accordingly configured such that the book blocks can be present in the transport duct, in which they are to be conveyed onwards, at any desired angle to the transport duct from vertical to horizontal. As a result of the construction of the aforementioned transport device, the feed element can merely be rotated in a single direction, the book blocks being able to fall apart and fan out in the relatively large radially formed intermediate spaces between the racks during the rotational movement. Here, there is the risk that the book blocks may be damaged when fanning out. This can greatly limit the transport speed of the books. As a result of the paddle-wheel-like feed element with a disc which is delimited on one side, it is also not possible to operate a plurality of handover devices on the same transport duct.

In a further embodiment from this specification, shown in FIG. 1, book blocks are initially conveyed into the transport duct using feed elements, in the form of racks, of a feed device. Here, they are received by transport fingers of the transport device and conveyed away along the transport duct. Since the feed elements have a speed component counter to the conveying direction of the transport duct when the book blocks are deposited, and the book blocks are received by the transport fingers at the deposition time, the speed difference between the book block and the transport finger increases. In particular at relatively high operating speeds, this increases the risk of the book blocks falling apart or the individual printed sheets disadvantageously shifting with respect to one another. When a book block is handed over to the transport device, the respective feed device is arranged above the transport duct, meaning that the book block has to overcome a height difference from the transport duct when deposited by the transport finger, increasing the risk of falling apart or shifting. In addition, this feed device is found to be relatively complex, high-maintenance and expensive.

SUMMARY

In an embodiment, the present invention provides a device for feeding a book block, which is formed of at least one printed sheet and transported flat, to a processing station in a clocked manner. The first transport device has a comb-shaped introduction flap and a plurality of transport units, the introduction flap including a plurality of teeth disposed on a base part and a plurality of recesses formed between the teeth. The second transport device has a transport duct and a transport finger, the transport duct having a contact surface, a clearance and a gap, the transport finger being disposed in the gap and the first transport device being configured to engage, by the introduction flap, in the clearance. The recesses are open in a direction facing away from the transport duct. The transport units are disposed on a first side of the introduction flap remote from the transport duct and engage in the recesses. The introduction flap is connected to a controllable drive and has a pivot axis disposed on a second side of the introduction flap facing the transport duct.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
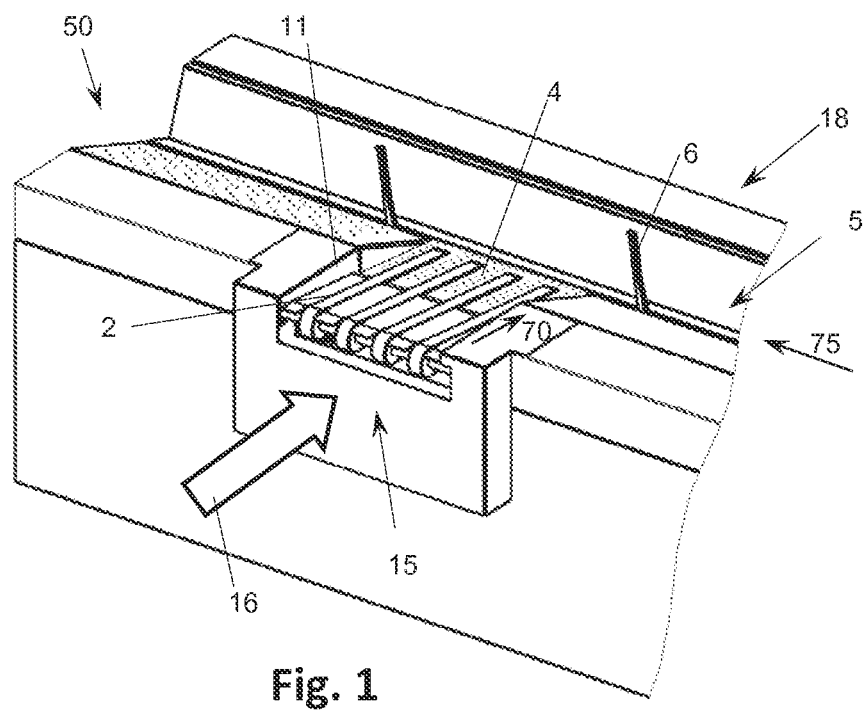
FIG. 1 shows a device for feeding book blocks out of a first transport device and into a second transport device.

In an embodiment, the present invention provides a simple, compact and cost-effective feed device and a method by which book blocks can be fed to the transport duct of a transport device whilst treating the product gently, even at high throughputs, without the book blocks falling apart during feeding or transfer by the transport finger of the transport duct or individual printed sheets of the book block shifting unreliably with respect to one another.

According to an embodiment, book blocks are transferred into a transport duct of a second transport device using a first transport device. The first transport device comprises an introduction flap and a plurality of transport units arranged on the side of the introduction flap remote from the transport duct. Upon leaving the first transport device, the book blocks are lifted off the first transport device by means of the introduction flap and subsequently received and conveyed away by the transport fingers of the second transport device.

Preferably, the introduction flap of the feed device has a first position for receiving the book block from the transport units of the first transport device and a second position for handing over the book block into the transport duct of the second transport device, and is arranged so as to be pivotable from the first position to the second position and back. An arrangement of this type of the introduction flap, in which the two positions can be separated by as small an angle as possible, facilitates a rapid change between the two positions, making rapid onward transport of the book block possible without wasting time.

In a preferred embodiment, the pivot axle of the introduction flap is positioned inside the introduction flap, the introduction flap being pivotable into the first position to receive the book block from the first transport device, and part of the teeth of the introduction flap being positioned underneath a downstream end of the transport units in this first position. Since in this position part of the end region of the introduction flap contacts the book block conveyed over it, and thus decelerates it in advance, the book block can be transported even faster on the first transport device.

Further, the controllable drive of the introduction flap may be in the form of a stepper motor, a linear motor or a servo motor and/or a pneumatic device. The possibility of selecting from the various types of drive makes it possible to select the drive system which meets the relevant requirements and can be produced most cost-effectively.

Further, the drive may also be formed so as to be controllable as a function of a separation and/or a speed of the transport fingers. It can thus be provided that the book blocks are received by the transport fingers arranged in the transport duct at the optimum time and as a result the sheet orientation in the book block is not changed or worsened even at high speeds.

In a development of the feed device, the drive may be controllable as a function of the height and/or width and/or mass of the book block and/or the friction between the individual sheets in the book block. Adaptation to these parameters makes higher flexibility of the device possible, for example, since this additionally makes it possible to feed book blocks of different formats and constitutions.

In a development of the feed device, the introduction flap and/or the contact surface of the transport duct may comprise air outlet openings supplied with blowing air. This causes air cushions to form under the transported book blocks, reducing the friction of the book blocks during feeding and making it possible to achieve higher feed speeds.

It has been found to be advantageous that the introduction flap is pivoted into the first position to receive the book block from the first transport device, part of the teeth of the introduction flap being positioned underneath the downstream end of the transport units in this position. This means that the introduction flap can be used to decelerate the book blocks in advance by way of contact with the introduction flap. Subsequently, the book block does not start to be received until the desired moment, the introduction flap being displaced from the further position into the first position.

It has likewise been found to be advantageous if the introduction flap is pivoted by means of a controllable drive, pneumatically, servo-pneumatically, using a servo motor, a stepper motor or a linear motor. The different types of drive make it possible to select the drive system which meets the relevant requirements and can be produced most cost-effectively.

If the drive of the introduction flap is actuated as a function of a transport finger separation and/or a transport finger speed, the time when the book block is received by the transport fingers arranged in the transport duct can be optimised.

A further advantageous development of the invention arises if the drive is actuated as a function of the height and/or width and/or mass of the book block and/or the friction between the individual sheets of the book block. Adaptation to these parameters makes higher flexibility of the method sequences possible, since this additionally makes it possible to feed book blocks of different formats and constitutions.

If pressurised air is applied to a book block located on the introduction flap and/or on a contact surface of the transport duct, via air outlet openings in the introduction flap and/or in the contact surface, an air cushion is formed under the book block, reducing the friction of the book block during feeding and making a higher feed speed possible.

FIG. 1 is a perspective drawing of a device 50 for feeding book blocks 1 comprising an upstream clocking-in device 16, a first transport device 15 and a second transport device 18. In this context, the first transport device 15 comprises an introduction flap 4 and transport units 2 in the form of transport belts. For its part, the second transport device 18 comprises a transport duct 5 and transport fingers 6.

Figure 2:
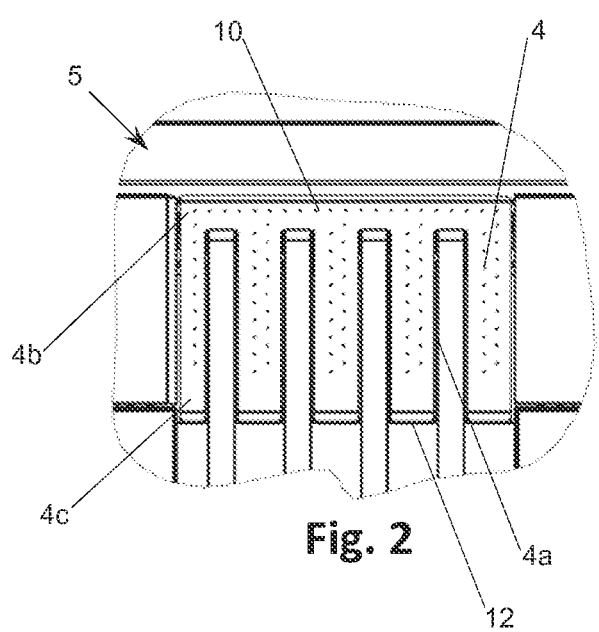
FIG. 2 is a plan view of the introduction flap of FIG. 1, and FIGS. 3a, 3b to 6a, 6b show a book block feed device in various phases of feeding a book block from the first transport device into the second transport device.

FIG. 2 is a simplified drawing of a comb-shaped introduction flap 4 comprising a plurality of recesses 4a, a side 4b formed as a base part 10 and facing the transport duct 5 of FIG. 1, and a side 4c formed as teeth 12 and remote from the transport duct 5.

FIGS. 3 to 6 show various phases of feeding a book block from the first transport device 15 into the second transport device 18, in each case in a perspective view 3a, 4a, 5a, 6a and a sectional view 3b, 4b, 5b, 6b. The first transport device 15 shown in FIG. 3a, 4a, 5a, 6a basically comprises the transport units 2 having a downstream end 2a, a transport table 3 and an introduction flap 4. In the present embodiment, the transport units 2 are formed as transport belts, which engage in the recesses 4a of the introduction flap 4, which are arranged on the side of the introduction flap 4 remote from the transport duct 5. The introduction flap 4, which is arranged to engage in a clearance 5e of the transport duct 5, comprises a plurality of teeth 12 arranged on a base part 10. Recesses 4a facing away from the transport duct 5 are arranged between these teeth 12. A pivot axle 9 of the introduction flap 4, for pivoting it from a first position 81 into a second position 82 and back, is arranged on the side 4b of the introduction flap 4 facing the transport duct 5.

FIGS. 1 to 6 show the feed device 50 with the first transport device 15 thereof perpendicular to the second transport device 18. Using simple constructional variants known to a person skilled in art, for example the arrangement of the teeth 12 at a desired angle to the base part 10, the orientation of the recesses 4a, the clearances 5e etc., the feed device 50 can be formed in such a way that any desired angle can be provided between the first transport device 15 and the second transport device 18. In a feed device 50 in which the transport device 15 is arranged at an acute angle to the transport duct 5, a speed component in the conveying direction 75 of the transport duct 5 is already applied to the book block 1 during feeding. A configuration of this type is more complex to implement, but makes higher transport speeds possible.

The transport table 3 comprises, on the side thereof facing the transport duct 5, recesses 3a in which the transport units 2 in the form of transport belts are arranged, the clearances 3a accordingly being formed as a function of the angle between the first transport device 15 and the second transport device 18.

A drive 7, which is arranged underneath the introduction flap 4 and may be in the form of a servo motor, stepper motor, linear motor or pneumatic/servo-pneumatic device, is connected to the introduction flap 4 in terms of drive via a linkage 8. FIGS. 3b, 4b, 5b, 6b schematically show a connection between the drive 7 and a control system 60 in the form of a control line. A further control line connects the control system 60 to a pressurised air source 90. The introduction flap 4 and the upper contact surface 5a comprise air outlet openings 17, which are shown as dots. A connection between the pressurised air source 90 and a plurality of air outlet openings 17 is likewise merely shown schematically.

FIGS. 3a, 4a, 5a, 6a show the first transport device 15 comprising the differently positioned introduction flap 4. In FIGS. 3b and 4b the introduction flap 4 is located in a first position 81, a receiving position for receiving the book block 1 from the transport units 2. In FIG. 6b, the introduction flap is in a second position 82, a handover position for handing over the book block 1 to the transport duct 5 of the second transport device 18. In this context, the first position 81 may be arranged in such a way that the introduction flap 4 is arranged either flush with the transport units 2 or even slightly underneath the transport units 2. The mounting of the drive and deflection wheels of the transport belts and the transport table 3, the mounting of the pivot axle 9 of the introduction flap 4, and also the drive 7 are arranged on a frame 20. In the transport duct, at least the contact surfaces 5a, 5b are at an inclination to the horizontal or shaped concave.

As is shown in FIG. 1, the book blocks 1 of the device 50 are fed in a conveying direction 70 of the first transport device 15 at a constant speed by means of the clocking-in device 16, the book blocks 1 being clocked in as a function of the speed and separation of the transport fingers 6 of the second transport device 18. They are clocked in in a known manner, as disclosed for example in DE3621601, irregularly spaced articles being fed to a conveying device with the correct physical and temporal spacing.

The book block 1 is orientated laterally towards the fixing edge stop 11 of the book block feed device 50 by means of lateral guide plates or similar devices, which are known to the person skilled in the art.

By means of the drive 7, via the linkage 8, the introduction flap 4 is displaced between the first position, in which it is flush with the transport units 2, and the second position 82, in which it is flush with the contact surfaces 5a, 5b of the transport duct 5 or approximately 5° steeper than the contact surfaces 5a, 5b. The air outlet openings 17 of the introduction flap 4 and of the upper contact surface 5a can be supplied with blowing air to reduce the friction between the book block 1 and these surfaces.

Because in the transport duct 5 at least the contact surfaces 5a and 5b are at an inclination to the horizontal or shaped concave, the leading edge of the book block 1 is positioned securely on a guide surface 5d of the transport duct 5.

FIGS. 3a and 3b show the book block 1 which is being transported towards the transport duct 5 by the transport units 2, the book block 1 already being located in the region of the introduction flap 4. In FIGS. 3a, 3b and 4a, 4b, the introduction flap is located in the first position 81, the book block 1 being handed over by means of the introduction flap 4. In accordance with FIGS. 4a, 4b, the leading edge of the book block 1, which is being transported towards the transport duct 5 by the transport units 2, is already protruding over the gap 5c for the transport fingers 6. The pivot axle 9 is arranged inside the introduction flap 4. By means of the pivot axle 9, the introduction flap 4 for receiving the book block 1 from the transport units 2 is pivoted into a first position 81, part of the teeth 12 of the introduction flap 4 being positioned underneath the downstream end 2a of the transport units 2 in this first position 81. The book block 1 fed by the transport units 2 is handed over to the introduction flap 4 and decelerated in advance thereon.

FIGS. 5a and 5b show the book block 1 with the leading edge thereof shortly before the guide surface 5d, approximately perpendicular to the contact surfaces 5a, 5b, 5c, of the transport duct 5. The introduction flap 4 starts to move towards the second position 82, causing the book block 1 to lose contact with the transport units 2 and no longer be propelled thereby.

FIGS. 6a and 6b show the book block 1 fully conveyed into the transport duct 5. The leading edge thereof is positioned on the guide surface 5d, the introduction flap 4 is located in the second position 82 thereof, and the transport finger 6 is displacing the book block 1 from the introduction flap 4 in the conveying direction 75 of the transport duct 5. The handover of the book block 1 to the transport duct 5 may be influenced by the format thereof, in other words by the height and width of the book block. Together with the separation and/or the speed of the transport fingers 6, the spacing and speed at which the book blocks 1 are fed to the introduction flap 4 may also be adapted by means of the control system 60.

Book blocks 1 of a large height require a longer dwell time of the introduction flap in the second position 82, influencing the feed separation. Book blocks of a small height and a large width instead tend to twist or slide when being received by the transport finger 6. This results in a maximum permissible speed of the transport fingers 6.

So to be able to feed even these book blocks 1 with a higher speed of the transport fingers 6, there is the option of pivoting the introduction flap 4 to a much steeper inclination than was disclosed above at the time of the handover. Once the transport finger 6 has received the book block 1, the introduction flap 4 can be pivoted back approximately to the inclination of the contact surfaces 5a, 5b of the transport duct 5 so as to continue transporting the book block 1 gently.

The width of the book block, the feed speed and/or the mass of the book block 1 and the size of the contact surface thereof influence the time at which the introduction flap 4 has to lift the book block 1 off the transport units 2. To prevent the printed sheets from slipping within the book block 1 during transport, air can be blown vertically onto the book block 1 from above, increasing the friction between the individual printed sheets. All of the parameters (which are relevant to the method) are provided to the control system 60, in such a way that it can specify the optimum actuation of the introduction flap 4, the optimum amount of air from the pressurised air source 90 and the maximum permissible throughput for each book block 1.

The orientation state of the sheets in the book block 1 can be detected in the first transport device 15 and in the transport duct 5 downstream from the introduction flap 4, for example using cameras. The control system 60 can evaluate the data transmitted by the cameras and determine therefrom when the maximum permissible throughput for the respective book block 1 has been achieved.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B,"

unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A device for feeding a book block, which is formed of at least one printed sheet and transported flat, to a processing station in a clocked manner, the device comprising:
   a first transport device having a comb-shaped introduction flap and a plurality of transport units, the introduction flap including a plurality of teeth disposed on a base part and a plurality of recesses formed between the teeth; and
   a second transport device having a transport duct and a transport finger, the transport duct having a contact surface, a clearance and a gap, the transport finger being disposed in the gap and the first transport device being configured to engage, by the introduction flap, in the clearance,
   wherein the recesses are open in a direction facing away from the transport duct, the transport units are disposed on a first side of the introduction flap remote from the transport duct and engage in the recesses, and the introduction flap is connected to a controllable drive and has a pivot axis disposed on a second side of the introduction flap facing the transport duct.

2. The device according to claim 1, wherein the introduction flap has a first position for receiving the book block from the transport means and a second position for handing over the book block into the transport duct of the second transport device, and is arranged so as to be pivotable from the first position to the second position and back.

3. The device according to claim 2, wherein the pivot axle is arranged inside the introduction flap, the introduction flap being pivotable into the first position so as to receive the book block from the transport units, and a part of the teeth of the introduction flap being positioned underneath a downstream end of the transport units in the first position.

4. The device according to claim 1, wherein the controllable drive is at least one of a stepper motor, a linear motor, a servo motor and a pneumatic device.

5. The device according to claim 1, wherein the controllable drive is controllable as a function of at least one of a separation and a speed of the transport finger.

6. The device according to claim 1, wherein the controllable drive is controllable as a function of at least one of:
   a height of the book block;
   a width of the book block;
   a mass of the book block; and
   a friction level between individual sheets in the book block.

7. The device according to claim 1, wherein at least one of the introduction flap and the contact surface of the transport duct comprise air outlet openings which are connected to a pressurised air source.

8. A production plant comprising a device according to claim 1.

9. A method for feeding a book block, which is formed of at least one printed sheet and transported flat, to a processing station in a clocked manner, the method comprising:
   handing over, by means of a first transport device, the book block to a transport duct, having a contact surface, a clearance and a gap, of a second transport device, the first transport device having a comb-shaped introduction flap and a plurality of transport units, the introduction flap including a plurality of teeth disposed on a base part and a plurality of recesses formed between the teeth, the recesses being open in a direction facing away from the transport duct, the transport units being disposed on a first side of the introduction flap remote from the transport duct and engaging in the recesses, wherein, during the handing over, the introduction flap engages in the clearance of the transport duct and is pivoted from a first position in which the book block is received from the transport units into a second position in which the book block is handed over into the transport duct of the second transport device;
   receiving, after the handing over, the book block by a transport finger of the second transport device arranged in the gap in the transport duct and supplying the booked block to the processing station; and
   pivoting the introduction flap back to the first position.

10. The method according to claim 9, wherein part of the teeth of the introduction flap are positioned underneath a downstream end of the transport units in the first position.

11. The method according to claim 9, wherein the introduction flap is pivoted by means of a controllable drive, pneumatically, servo-pneumatically, using a servo motor, a stepper motor or a linear motor.

12. The method according to claim 11, wherein the controllable drive is actuated as a function of at least one of a transport finger separation and a transport finger speed.

13. The method according to claim 11, wherein the controllable drive is actuated as a function of at least one of:
   a height of the book block;
   a width of the book block;
   a mass of the book block; and
   a friction level between individual sheets in the book block.

14. The method according to claim 9, further comprising applying pressurised air to the book block located on the introduction flap or on the contact surface of the transport duct, via air outlet openings in the introduction flap or in the contact surface.

* * * * *